Figure 1:
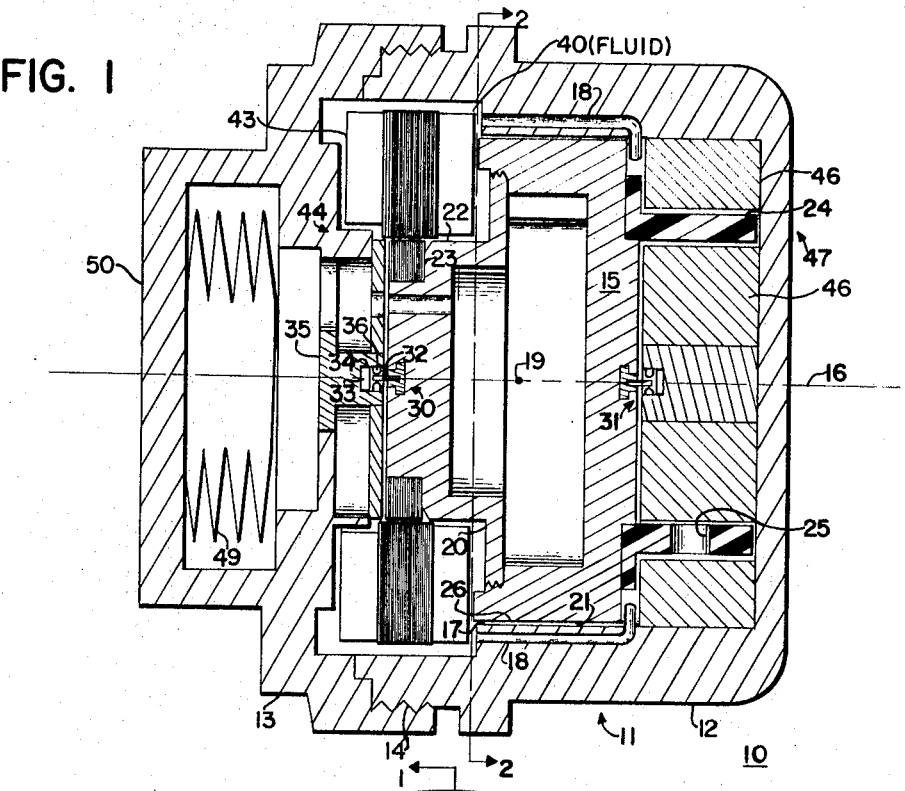

Feb. 13, 1968  O. G. FRYKMAN ET AL  3,368,409

ACCELERATION MEASURING APPARATUS

Filed June 24, 1964

INVENTORS.
OSCAR G. FRYKMAN,
ROBERT W. KOPP,
BY  & MARIO R. ROMANI

Charles J. Ungemach
ATTORNEY

United States Patent Office 3,368,409
Patented Feb. 13, 1968

3,368,409
ACCELERATION MEASURING APPARATUS
Oscar G. Frykman, Minneapolis, Robert W. Kopp, St. Paul, and Mario R. Romani, Minneapolis, Minn., assignors to Honeywell Inc., Minneapolis, Minn., a corporation of Delaware
Filed June 24, 1964, Ser. No. 377,685
5 Claims. (Cl. 73—516)

This invention pertains to sensitive instruments and more particularly to floated sensitive instruments. The applicants' invention has application to all floated, sensitive instruments, but it will be described with specific reference to a floated, pendulous accelerometer.

A typical floated, pendulous accelerometer contains a cylindrical seismic mass element mounted for rotation about an output axis. It is necessary, in order to obtain the required accelerometer accuracy and sensitivity, that the seismic mass mounting means be almost frictionless. The extremely low friction level is obtained through the utilization of pivot and jewel bearings in conjunction with a flotation fluid. The seismic mass element is immersed in a high density fluid so as to render the seismic mass element essentially "weightless." The fluid also functions to damp the rotation of the seismic mass element.

One of the major problems with such a floated accelerometer is the null uncertainty thereof when the output axis is oriented vertically. That is, the signal obtained when there is no acceleration input to the accelerometer (null condition) is not repeatable within the required limits. Thus, an error is introduced into the output signal of the accelerometer and the accuracy is severely reduced. This problem has existed in a floated accelerometer with which the applicants are familiar, for seven years without solution.

However, applicants' invention has solved this serious problem of output axis vertical null uncertainty. This results in a significant increase in accuracy of the floated instrument. The applicants' invention is solely responsible for a remarkable increase in manufacturing yield; from approximately ten percent to approximately sixty percent. The invention is based upon the discovery, after extensive testing, that the transient motion of the float succeeding an output axis inversion causes unpredictable torque variations to appear on the seismic mass. Acceleration measurements taken during this extended "settling time" are subject to these uncertain errors. These errors have most frequently appeared during null uncertainty testing and therefore appeared as and were classified as null uncertainties. The applicants' invention comprises a unique housing means for a floated instrument. A plurality of bypass passages are provided within the housing means to substantially reduce the settling time and thereby eliminate the long term null uncertainty without affecting the functioning of the other critical components of the floated instrument.

Figure 2:
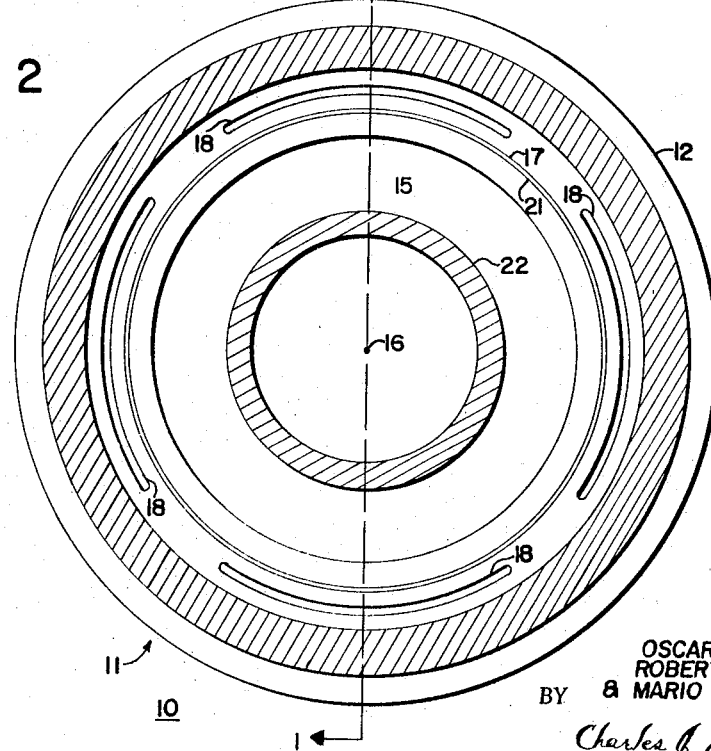

The applicants' invention will become apparent from a study of the accompanying specification and claims in conjunction with the drawing in which:

FIGURE 1 is a cross sectional view of a pendulous, floated accelerometer taken along section line 1—1 of FIGURE 2; and FIGURE 2 is a cross sectional view taken along section line 2—2 of FIGURE 1.

Referring now to FIGURE 1, reference numeral 10 generally depicts a floated pendulous accelerometer. Some of the component parts of accelerometer 10, which form no part of the present invention, are omitted from FIGURE 1 in the interest of clarity. Reference numeral 11 identifies a generally cylindrically shaped housing means comprising two cup-shaped members 12 and 13. Cup-shaped members 12 and 13 are joined together as at 14 so as to define a chamber 15 within housing means 11. Chamber 15 is symmetrical about an axis 16 which defines an output axis of accelerometer 10. The acceleration sensitive axis 19 of accelerometer 10 is perpendicular to axis 16. Chamber 15 includes a damping surface 17 formed on the inner surface of cup-shaped member 12 of housing means 11. Damping surface 17 is cylindrical in shape and has a short axial extent along axis 16 of accelerometer 10. A plurality of annular bypass passages 18 (see FIGURE 2), are provided within housing means 11. One end of each passage 18 is in communication with chamber 15 on one side of damping surface 17. The other end of each passage 18 is in communication with chamber 15 on the opposite side of damping surface 17.

A hollow, generally cylindrical seismic mass means 20, pendulous about output axis 16, is positioned within chamber 15. Seismic mass means 20 has a cylindrical damping surface 21 thereon which is axially aligned and concentric with damping surface 17. The diameter of damping surface 21 is slightly less than the diameter of damping surface 17. Damping surface 17 and damping surface 21 cooperate to form a damping gap 26 therebetween, which has a thickness of approximately .005 inch. One end of seismic mass 20 comprises a reduced diameter section 22 having a rotor element 23 mounted around a periphery thereof. The other end of seismic mass means 20 comprises an epoxy cup-shaped member 24 rigidly attached to seismic mass means 20. Member 24 has a torquer coil impregnated therein, the function of which will be explained hereinafter. A plurality of holes, such as 25, are angularly spaced around cup-shaped member 24 and extend therethrough.

Seismic mass means 20 is rotatably mounted within chamber 15 for rotation about axis 16 by means of mounting means 30 and 31. Mounting means 30 comprises a pivot member 32 rigidly attached to seismic mass 20 and extending along axis 16. Mounting means 30 also includes a thrust jewel element 33 positioned within a recess 34 within a mounting assembly 35 so as to be symmetrical about axis 16. Mounting assembly 35 is rigidly attached to cup-shaped member 13 of housing means 11. Mounting means 30 also includes a plurality of journal jewel elements 36 which are positioned within recess 34. Jewel elements 36 are spaced apart from and angularly positioned about axis 16. Pivot element 32 is positioned within recess 34 and is surrounded by journal jewel elements 36 and contiguous to thrust jewel element 33. Thus, mounting means 30 provides a low friction mounting means wherein the only friction is due to the contact between pivot member 32 and jewel elements 33 and 36. It should be noted that thrust jewel 33 is not in contact with pivot 32 at all times, but is normally spaced a small distance therefrom (approximately .001 inch). Mounting means 31 is substantially identical to mounting means 30 and need not be discussed in detail.

A fluid 40 fills chamber 15 in housing means 11 so as to virtually support the weight of seismic mass 20. In practice, fluid 40 has a high density so that seismic mass element is 99.2 percent floated. Thus, very little weight is supported by mounting means 30 and 31 and the frictional level thereof is very low. Fluid 40 is a Newtonian fluid and functions to damp the rotation of seismic mass 20 about axis 16 due to the shearing action of the fluid within damping gap 26.

Stator windings 43 are rigidly attached to housing means 11 and circumscribe rotor element 23 positioned upon seismic mass means 20. Stator windings 43 and rotor element 23 coact to form a signal generator means 44 which functions to generate an output signal indicative of the rotation of seismic mass 20 about output axis 16. Various types of signal generators, such as signal generator 44, are well known to those skilled in the art. Thus, signal generator 44 need not be described in detail.

Cup-shaped element 24 of seismic mass 20, fits into an annular opening within a permanent magnet structure 46 which is rigidly attached to cup-shaped element 12 of housing means 11. Cup-shaped element 24 with its impregnated coil coacts with permanent magnet structure 46 so as to form a moving coil permanent magnet torque generator 47. The signal from signal generator 44 is amplified externally and fed to torque generator 47. The torque generated by torque generator 47 is exerted upon the seismic mass means 20 so as to return it to its null position. Torque generators are well known to those skilled in the art and torque generator 47 need not be described in detail.

A bellows means 49 is provided within chamber 15 to compensate for volumetric changes of fluid 40 with temperature changes.

With the seismic mass means 20 positioned within chamber 15, one end of each annular bypass passage 18 is in communication with chamber 15 on one side of damping gap 26. The other end of each of the annular bypass passages 18 is in communication with chamber 15 on the other side of damping gap 26. Thus, fluid 40 may pass from one side of seismic mass means 20 to the other side through bypass passage 18 without flowing through damping gap 26.

In operation, accelerometer 10 is mounted upon a vehicle so as to sense the acceleration thereof. The acceleration sensitive axis 19 of accelerometer 10 is aligned in the direction along which the acceleration is desired to be sensed. Since seismic mass means 20 is pendulous in nature and is mounted for rotation about axis 16 by means of low friction mounting means, an acceleration along axis 19 results in rotation of seismic mass means 20. The amount of rotation of seismic mass means 20 is sensed by signal generator means 44. Fluid 40 functions to damp the rotation of seismic mass 20. Signal generator means 44 produces a signal indicative of the amount of rotation of seismic mass means 20 which is amplified by suitable means (not shown) and fed to torque generator 47. Torque generator 47 functions to apply a force to seismic mass means 20 tending to return it to its null position. The magnitude of the signal from signal generator means 44 to torque generator 47 is indicative of the acceleration applied to accelerometer 10. Thus, it is clear that any variation (null uncertainty) in the output signal due to forces other than the applied acceleration reduces the accuracy of accelerometer 10.

Output axis vertical null uncertainty is tested by first stabilizing the accelerometer with its output axis vertical and determining its output signal. Then the accelerometer is physically displaced so that the output axis is approximately horizontal for a short period of time; this subjects the accelerometer to an acceleration along its input axis. Then the output axis of the accelerometer is returned to the vertical position; the output signal obtained in the vertical position should not exceed $$10 \times 10^{-5} \, g$$

deviation from the previous output signal.

More specifically, when output axis 16 is oriented parallel to the gravity vertical with bellows end 50 of accelerometer 10 positioned downward for a sufficient period of time, pivot 31 is in engagement with its mating thrust jewel 33 due to the acceleration (force of gravity) acting upon the unfloated percentage of seismic mass 20. That is, seismic mass means 20 is axially displaced along axis 16 from its centered position within chamber 15. This results in a greater amount of fluid 40 being on the signal generator side of damping gap 26 than if seismic mass means 20 were axially centered in chamber 15. When accelerometer 10 is inverted, bellows end 50 of accelerometer 10 is positioned upwardly and output axis 16 is parallel to the gravity vertical. As was previously indicated, mounting means 30 and 31 allow limited axial movement of seismic mass means 20 along axis 16 due to the end clearance therein. When accelerometer 10 is inverted, a number of forces are exerted upon seismic mass means 20. These axial forces include: (1) acceleration (gravity) force due to the unfloated portion of seismic mass means 20; (2) magnetic axial centering forces from the signal generator and torque generator; and (3) fluid forces due to the convection current flow due to the inversion of the "hot end."

The acceleration force is temperature dependent since the density of the floatation fluid 40 will vary with temperature changes. If the temperature of the floatation fluid is such that the seismic mass is not fully floated, the acceleration force will be directed downwardly along the gravity vertical. When the density of fluid 40 changes such that seismic mass means is fully floated, there will be no acceleration force acting upon seismic mass means 20. When the density of fluid 40 increases such that seismic mass means 20 is more than fully floated, the acceleration force will be directed upwardly along the gravity vertical. Since *perfect* floatation is not practically achievable, the seismic mass 20 is intentionally overfloated at normal operating temperature such that the acceleration force acts upwardly on the seismic mass 20 along the local gravity vertical. The magnetic axial centering forces from the signal and torque generators is dependent only upon accelerometer orientation. That is, it is a force which reverses direction with accelerometer inversion. The fluid convection forces are constant in direction with respect to gravity. That is, the fluid convection currents would tend to force the seismic mass means upwardly regardless of the operating temperature.

The applicants have discovered that the combination of all of these forces adversely affects the accelerometer accuracy and performance. More specifically, it has been discovered that when the output axis of the accelerometer is inverted, the time it takes for the seismic mass means 20 to move from engagement with one thrust jewel, such as 33, to the other thrust jewel along axis 16 varies considerably. For example, various accelerometers take from an hour to greater than six hours to move this small axial distance. This variation in time for the seismic mass to traverse the output axis end to end clearance, the applicants have discovered is a contributing cause of the null uncertainty since unpredictable, transient torques are created by the gimbal motion. This closes variations in null readings taken during this period resulting in accelerometer performance degradation.

The applicants have solved this critical problem and have increased the yield of the accelerometer production build from approximately ten percent to approximately sixty percent. The applicants have solved this problem by utilizing a unique accelerometer housing 11. One end of each bypass passage 18 is in communication with chamber 15 on one side of damping gap 26. The other end of each bypass passage 18 is in communication with chamber 15 on the other side of damping gap 26. When accelerometer 10 is displaced from a stabilized position with output axis 16 parallel to the gravity vertical, seismic mass means 20 tends to be displaced axially along axis 16. The axial displacement is maximum when accelerometer 10 is inverted. When seismic mass means 20 is axially displaced within chamber 15, fluid 40 is forced from one side of seismic mass to the other side. Damping gap 26 and bypass passages 18 are the only fluid pasages through which fluid 40 may pass from one side of seismic mass 20 to the other side. Fluid 40 which is positioned inside of cup-shaped member 24 of torque generator 47 may pass radially outwardly through openings 25 so as to reach passages 18. Damping gap 26 provides a much higher resistance to the flow of fluid than do bypass pasages 18. Because of the critical damping function performed by damping gap 26, it is impossible to change the dimensions thereof. Bypass passages 18 are larger than damping gap 26 is evident from the figure. In practice, damping gap 26 is approximately .005 inch; bypass passages 18 are approximately .045 inch. Consequently, the large proportion of the fluid on one side of seismic mass means 20 flows through bypass passages 18 to the other side when accelerometer 10 is inverted. This substantially reduces the time required for seismic mass 20 to move axially along axis 16 from one thrust jewel to the other. The end result is that the output axis vertical, null uncertainty is substantially eliminated and the accuracy and performance of the accelerometer substantially increased.

Thus, the applicants have solved a problem which has been associated with a floated accelerometer for more than seven years. The solution to the problem is based upon a discovery of the primary cause of the output axis vertical null uncertainty by the applicants. The applicants have provided a unique housing means for the accelerometer which solves the problems caused by axial displacement of the seismic mass means within the accelerometer chamber.

Although this invention has been described and illustrated in detail, it is to be clearly understood that the same is by way of illustration and example only and is not to be taken by way of limitation, the scope of this invention being limited only by the terms of the appended claims.

We claim:

1. A force rebalance accelerometer comprising:
housing means having a chamber therein, said chamber having a first cylindrical damping surface thereon;
pendulous seismic mass having a second cylindrical damping surface thereon;
mounting means for mounting said seismic mass within said chamber for rotation about an output axis, said first damping surface being axially positioned opposite and radially spaced from said second damping surface so as to define a damping gap therebetween, said mounting means allowing limited axial movement of said seismic mass along the output axis;
fluid means filling said chamber and surrounding said seismic mass, said seismic mass being buoyantly supported by said fluid means;
a plurality of bypass passages within said housing means, one end of each of said plurality of passages being in communication with said chamber on one side of said damping gap, the other end of each of said plurality of passages being in communication with said chamber on the other side of said damping gap, whereby a portion of said fluid means may flow from one side of said seismic mass to the other side through said plurality of passages without flowing through said damping gap;
signal generator means operable to provide a signal indicative of the rotation of said seismic mass relative to said housing;
torque generator means; and
means connecting said signal generator means to said torque generator means, whereby a signal from said signal generator means energizes said torquer means so as to exert a force upon said seismic mass tending to rebalance the rotation of said seismic mass means.

2. An accelerometer comprising:
housing means having a chamber therein, said chamber having a first cylindrical damping surface thereon;
pendulous seismic mass having a second cylindrical damping surface thereon;
mounting means for mounting said seismic mass within said chamber for rotation about an output axis, said first damping surface being axially positioned opposite and radially spaced from said second damping surface so as to define a damping gap therebetween, said mounting means allowing limited axial movement of said seismic mass along the output axis;
fluid means filling said chamber and surrounding said seismic mass;
a plurality of bypass passages within said housing means, one end of each of said plurality passages being in communication with said chamber on one side of said damping gap, the other end of each of said plurality of passages being in communication with said chamber on the other side of said damping gap, whereby a portion of said fluid means may flow from one side of said seismic mass to the other side through said plurality of passages without flowing through said damping gap; and
signal generator means operable to provide a signal indicative of the rotation of said seismic mass relative to said housing.

3. A floated sensitive instrument comprising:
housing means having a chamber therein, said chamber having a first damping surface thereon;
rotatable element having a second damping surface thereon;
mounting means for mounting said element within said chamber for rotation about an axis, said first damping surface being axially positioned opposite and radially spaced from said second damping surface so as to define a damping gap therebetween, said mounting means allowing limited axial movement of said element along the output axis;
fluid means filling said chamber and surrounding said element;
a plurality of bypass passages within said housing means, each of said plurality of passages connecting the portion of said chamber on one side of said damping gap to the portion of said chamber on the other side of said damping gap whereby a portion of said fluid means may flow from one side of said element to the other side through said plurality of passages without flowing through said damping gap;
signal generator means operable to provide a signal indicative of the rotation of said element relative to said housing;
torque generator means; and
means connecting said signal generator means to said torque generator means.

4. A floated sensitive instrument comprising:
housing means having a chamber therein, said chamber having a first damping surface thereon;
rotatable element having a second damping surface thereon;
mounting means for mounting said element within said chamber for rotation about an axis so that said first damping surface and said second damping surface cooperate to provide a damping gap therebetween, said mounting means allowing limited axial movement of said element along the output axis;
fluid means positioned within said chamber and surrounding said element;
a plurality of bypass passages within said housing means, each of said plurality of passages connecting the portion of said chamber on one side of the damping gap to the portion of the chamber on the other side of the damping gap so that a portion of said fluid means can flow from one side of said element to the other side through said plurality of passages without passing through said damping gap; and
signal generator means operable to provide a signal indicative of the rotation of said element relative to said housing.

5. A floated sensitive instrument comprising:
housing means having a chamber therein;
a rotatable element positioned within said chamber so as to provide a damping gap therebetween;
means for mounting said element with said chamber for rotation about an output axis, said means for mounting allowing limited axial movement of said element along said output axis;

fluid means filling said chamber and surrounding said element;

a bypass passage within said housing means, each end of said passage being in communication with said chamber at locations on each side of said damping gap whereby a portion of said fluid means can flow from one side of said chamber to the other side through said passage without flowing through said damping gap; and signal generator means operable to provide a signal indicative of the rotation of said element relative to said housing.

References Cited
UNITED STATES PATENTS

| | | | |
|---|---|---|---|
| 2,332,994 | 10/1943 | Draper et al. | 73—516 X |
| 2,887,885 | 5/1959 | Lackey et al. | 74—5.5 |
| 2,900,823 | 8/1959 | White | 74—5.5 |
| 3,167,966 | 2/1965 | Asheleman | 73—497 |

JAMES J. GILL, *Primary Examiner.*